United States Patent
Klomp et al.

(10) Patent No.: US 9,864,558 B2
(45) Date of Patent: Jan. 9, 2018

(54) METHOD OF ESTIMATING A PROCESS DURATION FOR AN IMAGE REPRODUCTION JOB

(71) Applicant: Océ Holding B.V., Venlo (NL)

(72) Inventors: Edy I. H. C. Klomp, Venlo (NL); Tim F. P. Paffen, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/413,756

(22) Filed: Jan. 24, 2017

(65) Prior Publication Data
US 2017/0212716 A1    Jul. 27, 2017

(30) Foreign Application Priority Data

Jan. 25, 2016  (EP) .................................. 16152603

(51) Int. Cl.
*G06F 15/00*  (2006.01)
*G06F 3/12*  (2006.01)
(Continued)

(52) U.S. Cl.
CPC .......... *G06F 3/1296* (2013.01); *G06F 3/1203* (2013.01); *G06F 3/126* (2013.01);
(Continued)

(58) Field of Classification Search
CPC .... G06F 3/1296; G06F 3/1203; G06F 3/1229; G06F 3/126; G06F 3/1264;
(Continued)

(56) References Cited

U.S. PATENT DOCUMENTS 8,325,372 B2 *  12/2012  Klassen ................ G06F 3/1212
                                                     358/1.1
2003/0133141 A1 *  7/2003  Toda ..................... G06F 3/1211
                                                     358/1.13
(Continued)

FOREIGN PATENT DOCUMENTS

EP        3001304 A1     3/2016
JP        3221249 B2    10/2001

OTHER PUBLICATIONS

European Search Report dated Jun. 14, 2017, for corresponding European Application No. 17151912.

*Primary Examiner* — Douglas Tran
(74) *Attorney, Agent, or Firm* — Birch, Stewart, Kolasch & Birch, LLP (57) ABSTRACT

A method of controlling an image reproduction system, wherein a process duration is estimated on the basis of a measured time (D) for the processing of a number (n) of pages that have been processed already, the method comprising storing a digital table which contains a number of pre-defined job types as well as a respective correction factor (A4) for each job type; when a job is received (S1), assigning (S2) a job type to the received job; calculating (S3) a first estimate (D1) for a time needed for processing at least a specified collection of pages from the job; calculating (S4) a second estimate (D2) by multiplying the first estimate (D1) with the correction factor (A4); when said specified collection of pages has been processed, calculating a deviation of the first estimate (D1), and updating (S9) the correction factor (A4); and storing the updated correction factor.

11 Claims, 4 Drawing Sheets

(51) Int. Cl.
    *G06K 1/00*      (2006.01)
    *G06K 15/02*     (2006.01)
    *G06K 15/00*     (2006.01)
    *H04N 1/00*      (2006.01)

(52) U.S. Cl.
    CPC .......... *G06F 3/1229* (2013.01); *G06F 3/1264* (2013.01); *G06K 15/1823* (2013.01); *G06K 15/4025* (2013.01); *H04N 1/0005* (2013.01); *H04N 1/00042* (2013.01); *H04N 1/00068* (2013.01)

(58) Field of Classification Search
    CPC ........... G06K 15/1823; G06K 15/4025; H04N 1/00042; H04N 1/0005; H04N 1/00068
    USPC ............................... 358/1.1, 1.15, 1.13, 1.14
    See application file for complete search history.

(56) References Cited

U.S. PATENT DOCUMENTS

2003/0184799 A1   10/2003   Ferlitsch
2005/0190383 A1    9/2005   Levin et al.

\* cited by examiner

| job type | | correction factors | | | | | | | |
|---|---|---|---|---|---|---|---|---|---|
| | finisher | 1 | | 2 | | 3 | | 4 | |
| | | A1 | n1 | A2 | n2 | A3 | n3 | A4 | n4 |
| type 1.1<br>80 g<br>simplex | staples | 1.1 | 50 | 1.15 | 100 | 1.17 | 80 | 1.18 | 10 |
| type 1.1<br>80 g<br>simplex<br>staples | no staples | 1.0 | 100 | 1.05 | 80 | 1.07 | 200 | 1.07 | 150 |
| type 2<br>100 g<br>duplex | booklet | 1.2 | 150 | 1.25 | 100 | 1.26 | 150 | 1.26 | 100 |
| | | | | | | | | | |

METHOD OF ESTIMATING A PROCESS DURATION FOR AN IMAGE REPRODUCTION JOB

CROSS-REFERENCE TO RELATED APPLICATIONS

This application claims priority under 35 U.S.C. §119 to Application No. 16152603.3, filed in Europe on Jan. 25, 2016, the entirety of which is expressly incorporated herein by reference.

BACKGROUND OF THE INVENTION

1. Field of the Invention

The invention relates to a method of controlling an image reproduction system, wherein a process duration for processing a reproduction job is estimated on the basis of a measured time for the processing of a number of pages that have been processed already.

2. Background of the Invention

In an image reproduction system, e.g. a printing system, it is a typical scenario that a plurality of print jobs are waiting in a print queue until they are processed. An electronic controller of the printing system has, among other things, the task to schedule the print jobs, i.e. to establish a time table showing the timings at which the jobs will be processed and at which certain actions related to the processing of the print jobs will have to take place. The schedule is typically displayed on a user interface so as to give the users at least a rough estimate as to when their jobs will be processed and when they may be expected to be ready. More importantly, the schedule permits to alert an operator of the printing system of the timings at which certain actions, such as providing a supply of media sheets of a specified type, removing printed copies from a discharge tray, and the like are necessary in order to keep the system running.

In the course of the scheduling process, it is necessary to estimate process durations for the processing of the individual print jobs and/or for processing certain collections or sets of pages to be printing within each print job. Such estimates may be based on a model of the print job, wherein the print job is segmented into a number of actions to be taken and an expected duration is specified for each individual action, so that it is possible to calculate an estimate for the total duration that will be needed for printing and possibly finishing a certain number of pages or for completing an entire print job, while taking into account that certain actions that may be performed in parallel.

However, the estimated durations for the individual actions are known only with a limited accuracy and may also vary in the course of time, due to changes in the processing conditions, such as environmental temperature, and the like. Additionally, combinations of actions may also lead to variations in time. Consequently, the estimates obtained on the basis of the model will inevitably involve a certain error.

It is known to improve the accuracy in the prediction of a process duration for a print job by correcting the estimated process duration in a feedback loop in which, when a certain number of pages have been completed, the processing time that has actually been needed is compared to the model-based time estimate, and the estimate for the next few pages to be printed is corrected accordingly. Consequently, the time when a print job will be ready can be predicted with higher accuracy.

EP 3001304 proposes a method in which an estimate for the duration of a print job is corrected by multiplying it with a correction factor that may be edited by the user.

SUMMARY OF THE INVENTION

It is an object of the invention to improve the accuracy with which the process duration can be predicted.

In order to achieve this object, an embodiment of the method according to the invention comprises the steps of: storing a digital table which contains a number of predefined job types a well as a respective correction factor for each job type; when a job is received, assigning a job type from the digital table to the received job; calculating a first estimate for a time needed for processing at least a specified collection of pages from the job, said first estimate being calculated on the basis of a model that reflects at least the dependency of the processing time on the number of pages to be processed; calculating a second estimate by multiplying the first estimate with the correction factor that is related to the assigned job type; when said specified collection of pages has been processed, calculating a deviation of the first estimate from the processing time that has actually been needed, and updating the correction factor on the basis of that deviation; and storing the updated correction factor in the digital table.

Thus, according to an aspect of the invention, the correction factor is updated in an iterative process that is continued not only over the duration of the current job but over all jobs that are to be processed with the system and are of the same type as the job for which the correction factor has been established.

This has the advantage that, in the course of time, the correction factor will asymptotically approach a value that results in a highly correct prediction for the process duration. Moreover, since separate correction factors are stored for a plurality of job types, an improvement in accuracy can also be obtained when print jobs of different types are added to the print queue, e.g. simplex print jobs and duplex print jobs, print jobs with different specifications for finishing processes, and the like. Whenever a print job of any type that is contained in the digital table is being processed, one or more iteration cycles may be performed for updating the correction factor that is specific to that type, and the updated correction factor is then also applicable to all other print jobs of the same type that are waiting in the print queue. This way of working requires a recalculation for other print jobs of the same type already residing in the print queue. Thus, in the long run, when one or more print jobs of each type have been processed, the correction factors for all job types in consideration will have been improved significantly, so that the process durations for all jobs in the print queue can be predicted more precisely, regardless of their type. This has the great advantage that there will be no large prediction errors which will accumulate over the jobs in the print queue. Consequently, the scheduling process can be improved significantly, especially for a long print queue with print jobs of mixed types.

More specific optional features and further developments of the invention are indicated in the dependent claims.

Since the correction factors are updated in an iterative process, the model that is used for calculating the first estimate for a job that has not been processed before is only of relatively little relevance, because the correction factor will quickly improve in the course of processing one or more jobs of this type. Therefore, although a detailed model of the print process will accelerate the convergence of the updated correction factors to the optimal value, even a very coarse and minimalistic model of the print process will soon lead to acceptable results, because the initial error will be corrected quickly as soon as some pages have been processed. Thus, in the extreme, the "model" may just consist of assuming an expected duration for printing a single page and multiplying this expected duration with the number of pages to be printed.

The job types listed in the digital table may be specified by a number of attributes, including media attributes, job attributes and finishing attributes. Examples for media attributes are: size of media sheets, weight of media sheets, surface type (normal or coated on one side or both sides, recycled, embossed, film transparency, label, postcard, vellum, cotton, matte, transparent film, translucent film), media family (coated/uncoated), sheets with or without tabs, cycle length, insert attributes, and the like. Examples of job attributes relate to the feed edge (long edge first (LEF) or short edge first (SEF)), simplex printing or duplex printing, printing order (last sheet first or first sheet first), sorting (by set or by page), and the like.

Examples of finishing attributes comprise: stacking, staples (number and position), scoring, folding (including different folding patterns), cut, die cutting, trimming, punch (number and position)/drilling, book, booklet or saddle stitching, ring binding/spiral binding/coil binding, laminate, perfect binding, coating, embossing, and the like.

A new job type may be dynamically added to the number of pre-defined job types on the basis of job specifications of a job which does not correspond to an already existing job type.

In principle, every combination of different values of these attributes may define another job type.

It may be preferable, however, to provide a separate treatment for the finishing attributes. For example, a job type may be defined by a specific combination of only the media attributes and the job attributes, whereas the finishing attributes are used to further divide the job type into a plurality of sub-types, each of which will be related to a specific correction factor in the digital table. Then, a unique job type may be assigned to a print job in which it is specified that different finishing attributes shall apply to different pages of this job. The correction factor for such a job type will then be calculated by forming a weighted sum of the correction factors that are related to the individual sub-types, the weight factors being the relative numbers of pages for which the respective finishing attributes shall apply.

The collection of pages for which the first estimate for the processing time is calculated may comprise all the pages of a print job or only a few pages of the print job, e.g. a fixed number of pages or, in case of a collated job, several sets of pages or only the pages of one set. The smaller the number of pages of the collection, the faster will be the conversion of the updated correction factors to the optimal value.

Preferably, the digital table stores, for each correction factor, a number of printed pages that have been involved in determining this correction factor. Then, when a new collection of pages has been printed and the correction factor is updated, the update may be a weighted sum of the old correction factor and the deviation that has been obtained for the new collection, the weight factors being the respective numbers of pages involved.

In case of relatively complex print jobs, e.g. non-collated jobs or jobs including mixed finishing attributes, it may be difficult and/or require a large amount of processing power to calculate a reasonable update for the correction factor. It is therefore not compulsory that the update procedure is performed for every print job or every collection of pages that has actually been processed. Instead, it may be useful to apply the update procedure only to jobs with a simple structure, for which the appropriate update can be calculated easily. The updates for the sub-types will then be based on jobs which have a unique finishing attribute and can therefore be subsumed entirely under a single sub-type. On the other hand, the latest updates of the correction factors will be available also for scheduling the more complex jobs, even when these jobs are not used for making a new update.

In one embodiment, the digital table may store not only one pair of correction factor and number of printed pages per job type, but rather a history comprising several pairs of correction factors and numbers of printed pages. This permits to apply a sliding window process for updating the correction factors with a window that may comprise, for example, a fixed number of pages or a fixed number of jobs. In this case, the updates will depend only upon the processing times that have been experienced in the sliding window, but the algorithm will "forget" the properties of print jobs that have been processed earlier. This may have the advantage that the update of the correction factors adapts more quickly to a change in the printing conditions, e.g. replacement of a constructional part of the printing system, change of environmental conditions, and the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements are identified with the same reference numeral.

Figure 1:
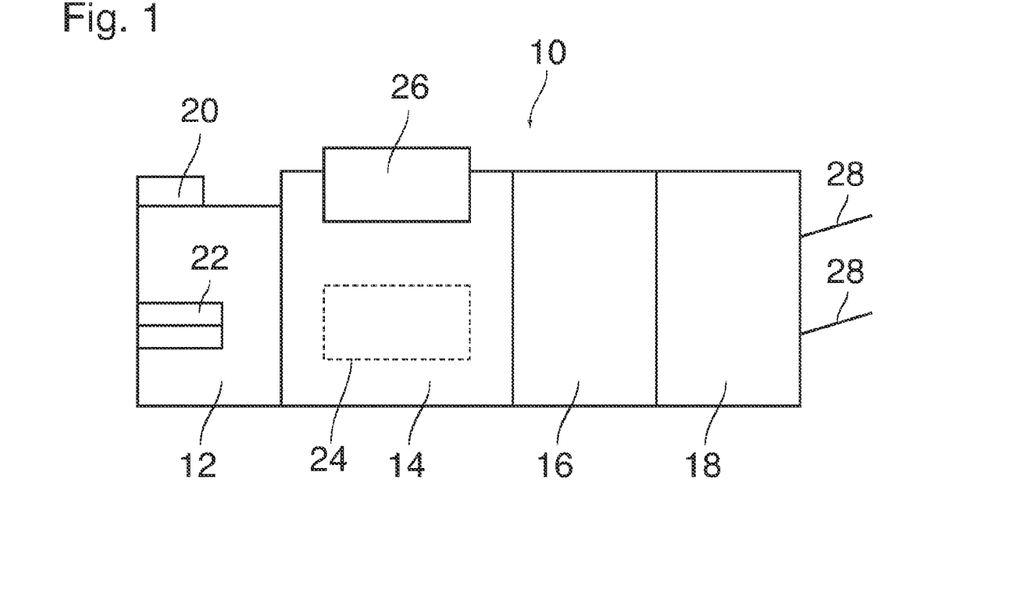
FIG. 1 is a diagram of a printing system to which the invention is applicable.

FIG. 1 shows a printing system 10 comprising an input section 12, a main processing section 14 and two cascaded finishers 16 and 18. The input section 12 is connected to a network for receiving print jobs from remote locations and includes a local scanner 20 where documents to be printed may be scanned-in. The input section 12 further includes storage bins 22 for storing media sheets of different types to be used for printing. The main processing section 14 includes a print engine for printing images on the media sheets supplied from the storage bins 22, and it further includes an electronic controller 24 and a local user interface 26. The finisher 16 is arranged to perform either finishing operations (stapling, punching or the like) on the printed media sheets received from the main processing section 14 or to pass the printed sheets on to the finisher 18 where other finishing operations may be performed and where the stacks of finished sheets are discharged on output trays 28.

The controller 24 is arranged to receive commands from the local user interface 26 or from remote user interfaces via the network and to control all operations of the input section 12, the main processing section 14 and the finishers 16, 18. Further, the controller 24 controls the user interface 26 for displaying messages and other information on a display of the user interface.

The finishers 16, 18 may be devices provided by the manufacturer of the main processing section 14. In that case, detailed information on the properties and capabilities of the finisher or finishers will be available in the controller 24. As an alternative, at least one of the finishers 16, 18 may be an OEM finisher from another manufacturer, which communicates with the controller 24 according to a standard DFD (Document Finishing Device) protocol. In that case, only limited information on the properties of the finisher may be available in the controller 24. At least, however, the controller 24 receives a signal when a finishing process for a document or a set of documents has been completed.

When one or more print jobs are received at the receiving section 12, a specific module in the controller 24, which is called a scheduler, sorts the received jobs by their priorities and arranges them in a print queue, which determines the sequence in which the jobs are to be processed. Further, based on more or less detailed information on the processing operations to be performed in the main processing section 14 and the finishers 16, 18, the scheduler calculates for each job a first estimate of the time that will be needed for processing the job. Based on these estimates, the scheduler calculates a time schedule, which will be displayed on the user interface 26 (and possibly also on remote user interfaces).

Figure 2:
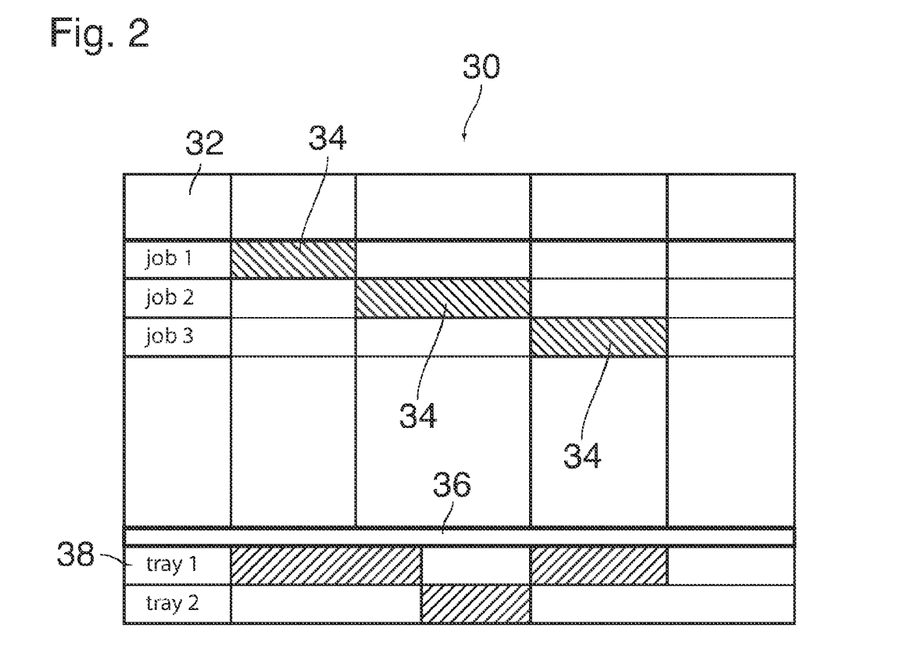
FIG. 2 is an example of a job schedule as displayed on a user interface of the printing system.

FIG. 2 is an example of such a time schedule for the simple case that only three print jobs "job 1", "job 2", "job 3" are waiting in the print queue. A column 32 on the left margin of the display screen identifies the print jobs, and a time bar 34 is displayed for each job. The time bars 34 symbolize the expected duration of the respective print job and indicate the start and end times of the jobs. These times can be read on a time scale 36 that is displayed below the time bars 34. A few lines 38 below the time scale 36 indicate the output trays 28 and the times when these trays are expected to be busy with discharging printed copies. Thus, a user who has entered one of the print jobs may see at a glance when his job can be expected to be ready and from which tray the copies may be fetched.

Further, although not shown in the drawings, the scheduler calculates the expected timings of certain events, which require an activity from the user or the operator of the printing system, such as refilling a storage bin 22, removing sheets from an output tray 28, and the like.

The estimates for the duration of the job processing as symbolized by the time bars 34 may be based on a more or less detailed model of the processing operations that are to be performed in the processing system and the times needed for each of these operations. Since the print jobs waiting in the print queue will normally belong to different types which differ in the values of a set of attributes which determine how the media sheets are to be processed, different models are needed for modeling the different job types and calculating the estimates for the processing duration. Inevitably, the estimates that are obtained in this way will involve certain errors, and as the errors will accumulate over the jobs in the print queue, relatively large errors in the estimated timings for the start and end of a print job and other relevant events may occur, especially for the jobs at the bottom of the print queue.

Figure 3:
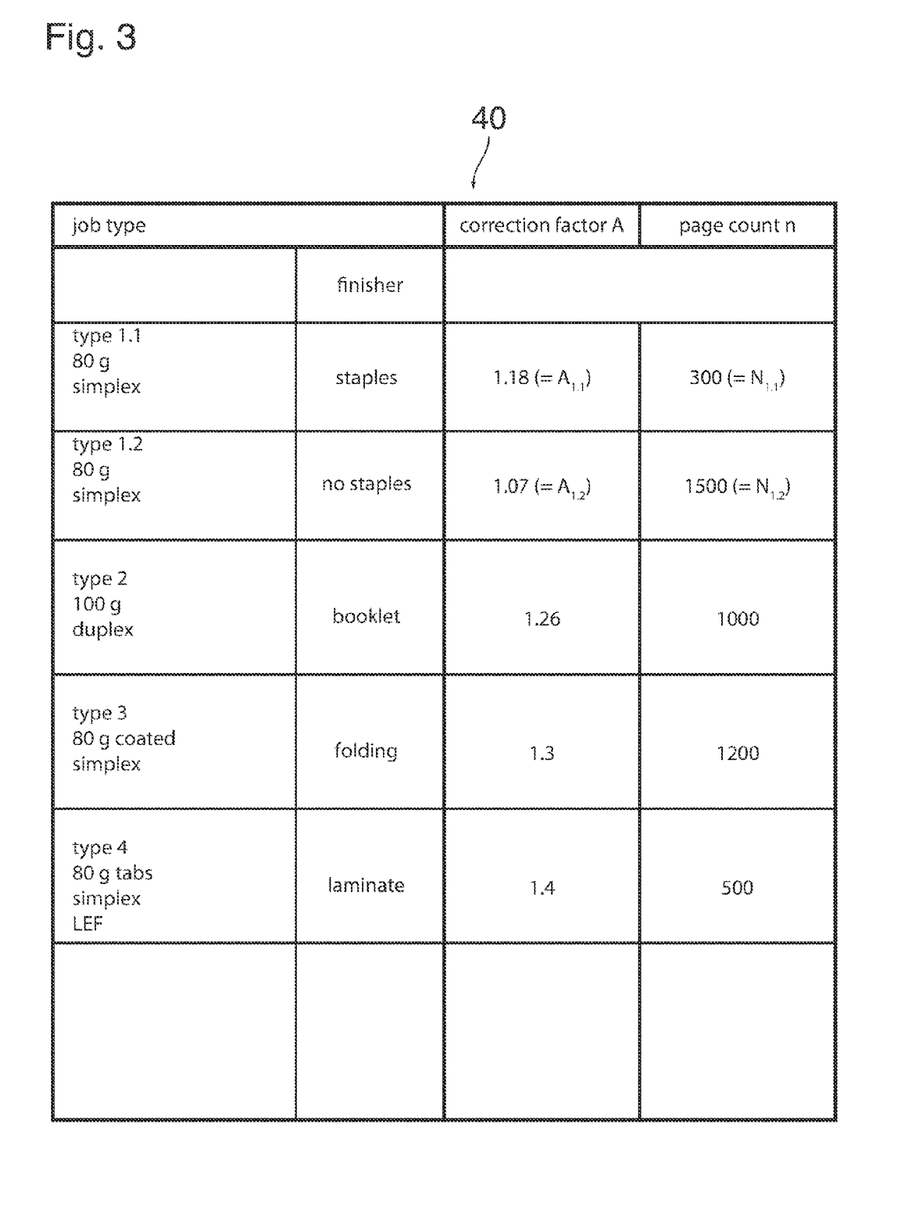
FIG. 3 is an example of a digital table including job types and related correction factors.

In order to reduce these errors, a digital table 40 of the kind shown in FIG. 3 is stored in the controller 24. This table 40 lists all the types of print jobs that are typically processed on the printing system 10, each job type being characterized by a specific selection of values for the processing attributes that are selectable in the printing system 10 and from part of the job specifications of the received jobs.

In this simple example, the table includes only four job types: type 1, type 2, type 3 and type 4, wherein type 1 is subdivided into two sub-types: type1.1 and type1.2. Further, in this simplified example, each job type is specified by only one media attribute specifying the media weight (80 g, 100 g, 80 g coated, or 80 g tabs) and one or two job attributes, i.e. the "plexity" (simplex or duplex) and the feed edge (LEF). The job types 2-4 are specified further by a unique finishing attribute (booklet, folding, or laminate). In case of type 1, the values of the media attributes (80 g) and the plexity (simplex) are identical for the two sub-types (this is the reason why the sub-types belong to a common generic type), and only the finishing attribute (staples or no staples) is different for the two sub-types.

The table 40 further includes a correction factor A and a page count n for each job type and sub-type. The correction factors A are based on empirical data that have been collected during the processing of a number n of pages (page count) from one or more jobs of the same type.

The correction factor A for a given job type or sub-type has the meaning that a more accurate second estimate for the expected processing duration is obtained by multiplying the first estimate, which was based on the model of the print process, with the correction factor A.

By way of example, it shall now be assumed that a print job to be processed is of the sub-type 1.1 and consists of printing 100 sets with 50 sheets per set, so that the total number of sheets to be printed in the entire job will be 5000. Further, it shall be assumed that a model-based first estimate D1 for the expected duration of processing one set (50 sheets) is 40 seconds. Thus, a first estimate for the expected duration of the entire job would be 100*40 seconds=4000 seconds. In the prior art, the time bar 34 displayed in the schedule 30 would correspond to these 4000 seconds. According to the invention, however, the first estimate D1 is multiplied with the correction factor A=1.18 which results in a second estimate D2 of 47.2 seconds for one set and 4720 seconds for the entire job. Consequently, the length of the time bar 34 initially displayed in the schedule 30 is 4720 seconds.

It shall now be assumed further that the actual processing duration D is measured while the first set of 50 pages has been printed and finished, and that the time that has actually been needed for this set turns out to be 50 seconds, which means that even the corrected estimate of 47.2 seconds was too small.

According to the invention, the correction factor A will now be updated on the basis of the result that has just been obtained for the finished set, more particularly, on the basis of an inaccuracy factor D/D1=50 s/40 s=1.25, which reflects the (relative) deviation of the true duration D from the first estimate D1. The updated correction factor $A_{updated}$ will then be calculated from the inaccuracy factor and from the former correction factor $A_{old}$ as read from the table 40 as follows:

$$A_{updated} = (n'*(D/D1) + n*A_{old})/(n'+n) \qquad (1)$$

wherein n' is in this case the number of the sheets of the set that has been processed, i.e. 50, and n is the page count read from the list 40. In the given example, $A_{updated}$=(50*1.25+ 300*1.18)/350=416.5/350=1.19.

In other words, the updated correction factor is a weighted sum of the inaccuracy factor for the last collection of pages done and the old correction factor, weighted by the numbers of pages.

The page count n will also be updated (in this case from 300 to 350) because the updated correction factor is based on a larger number of processed pages and will therefore be more reliable.

When this procedure is iterated each time a set of 50 sheets has been processed, the updated correction factors will quickly converge to the "exact" value which would be close to 1.25 in this example. The weighted sum slows down the convergence process but makes the correction factors less sensitive to statistical fluctuations.

It is even possible that no particular model is used for calculating the first estimate of the processing duration. The first estimate may simply be calculated by multiplying the number of pages to be processed with an arbitrary fixed time value which represents the time needed for processing a single page. The initial error will then be relatively large but will soon reduce to an acceptable figure.

Of course, the collection of pages that is used for a new update of the correction factor does not have to be the number of pages of one set. Instead, a smaller or a larger number may be selected.

The collection of pages used for the update may also be the total number of pages of the job (5000 in this example), so that an update would be performed only after the job has been completed. In that case, the update would of course not improve the prediction accuracy for the job being processed, but can still improve the prediction accuracy for other jobs of the same type that are to be processed later.

Initially, when no job of a given job type has as yet been processed, the correction factor A in the table 40 will be 1.0, and the page count n will be 0. Then, the same formula (1) as given above can be employed for calculating the first update.

In a practical printing system, the choice of the finisher and the finishing attributes will have an important impact not only on the process duration but also on the accuracy with which it can be predicted. This is particularly the case for OEM finishers for which no detailed model is available in the controller 24. However, the method according to the invention assures that the controller will quickly "learn" the properties of an unknown OEM finisher, so that relatively accurate predictions will be possible after a short time. Further, the updated correction factors will automatically adapt to a change in which the settings of the finisher have been changed. This property opens the possibility for the user to change the settings of the finisher himself, i.e. without asking the service personnel to change the settings of the finisher and make corresponding adaptions in the controller 24.

In practical applications, there may be cases where a print job provides different finishing attributes for different pages of the job. For example, each set of a job to be printed may contain a number of A4 pages that need not be folded, and a number of A3 pages that need to be folded, so that no unique finishing attribute can be assigned to the entire job.

For illustration purposes, a modified version of the example discussed above shall now be considered. According to this modification, the set of 50 pages shall comprise a sub-set of 25 pages which need to be stapled, and another sub-set of 25 pages (i.e. 50%) which shall not be stapled. Then, although the job is of the generic type 1, neither the correction factor $A_{1.1}$=1.18 for sub-type 1.1 nor the correction factor $A_{1.2}$=1.07 for sub-type 1.2 in the table 40 (FIG. 3) would be appropriate. It is possible, however, to calculate an average correction factor $A_{ave}$ by forming a weighted sum of the correction factors $A_{1.1}$ and $A_{2.2}$ in the table 40:

$$A_{ave} = (A_{1.1} * n_{1.1} + A_{1.2} * n_{1.2}) \qquad (2)$$

wherein $n_{1.1}$ and $n_{1.2}$ are the relative numbers of pages indicating the fraction of the number of pages to which the respective finishing attribute applies in relation to the total number of pages of the set. Thus, in the given example, $n_{1.1} = n_{1.2} = 0.5$.

Figure 4:
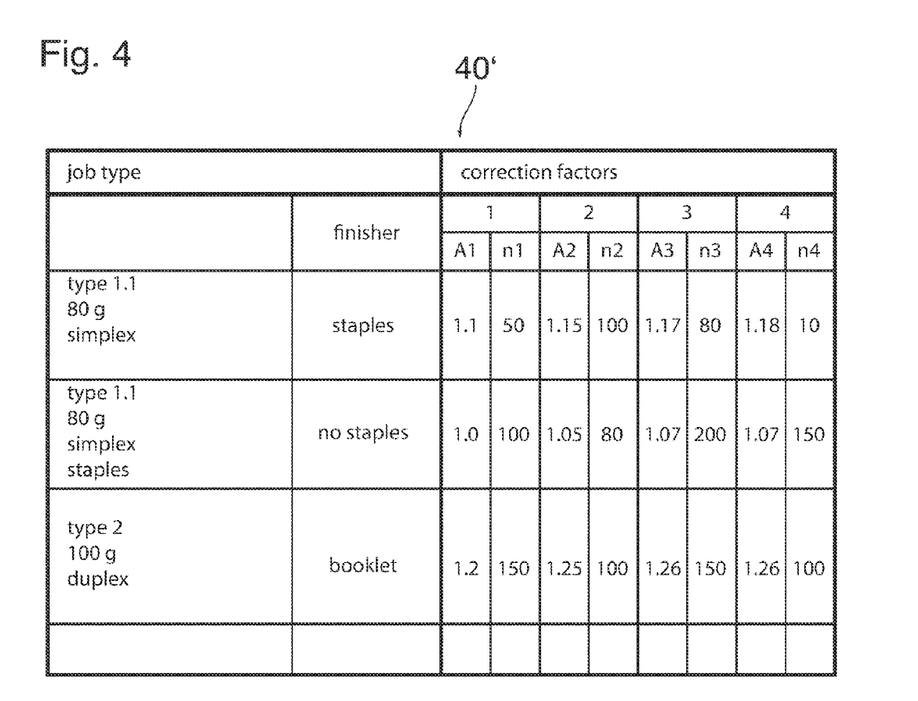
FIG. 4 is a digital table according to a modified example.

In the example shown in FIG. 3, the page counts n may become considerably large when a large number of jobs has been processed already. This may have the consequence that the adjusted correction factors A respond only slowly to any changes in the processing conditions which lead to a change in the actual processing durations. In view of this problem, FIG. 4 illustrates another embodiment in which a "sliding window" approach is used for updating the correction factors A. A "sliding window" approach is also advantageous to accelerate the convergence of the correction factors A when a finisher has been changed significantly.

FIG. 4 shows a modified table 40', which includes four pairs of correction factors A1-A4 and page counts n1-n4. These four pairs reflect the update history of the correction factors and page counts. A1 is the oldest correction factor obtained in an update cycle in which n1 pages had been processed. A2 is a correction factor that has been obtained by updating A1 in a cycle with n2 pages. Similarly, A3 has been obtained by updating A2 in a cycle with n3 pages, and A4 is the actual correction factor obtained by updating A3 in a cycle with n4 pages.

Thus, when the processing duration for a new print job has to be predicted, the second estimate D2 will be calculated on the basis of the correction factor A4 for the pertinent job type. Then, when a new update is to be made on the basis of a total of n new pages that have been processed, a new inaccuracy factor will be calculated, and the updated correction factor will be calculated by forming the weighted sum of the corrector factors A1-A4 and the new inaccuracy factor, weighted by their respective page counts. Then, the pair (A1, n1) will be discarded (of course, only for the job type for which the update is being made), and the other three pairs in the table 40' will be shifted-through, so that (A2, n2) becomes the new (A1, n1) and so on, and the newly updated correction factor becomes A4 and the corresponding page count n becomes n4. In this way, the last four updates form a "sliding window" which is shifted after each new update.

The size of the sliding window may be selected arbitrarily but experiences have shown that an optimal size may be between 4 and 20 occurrences of the pairs of correction factors.

There are several options for setting the conditions under which a new update is made and the sliding window is shifted. One strategy may be to cap the number of processed jobs that influence the actual correction factor A4. This can be implemented most easily by specifying that an update shall be made each time a print job of the pertinent type has been completed. Then, in the example shown in FIG. 4, the number of jobs will be capped to 5 (the actual job and the four preceding jobs for which the history is recorded in the table 40').

Another strategy may be to cap the number of pages that has been processed. This may be implemented for example by specifying that an update is made whenever 2000 pages have been processed (either immediately or when the next set has been completed). As a result, the total number of pages that influence the correction factor will be capped to about 10000 pages.

A lower cap for the total number of pages will result in a faster response of the updating mechanism to a change of conditions.

Figure 5:
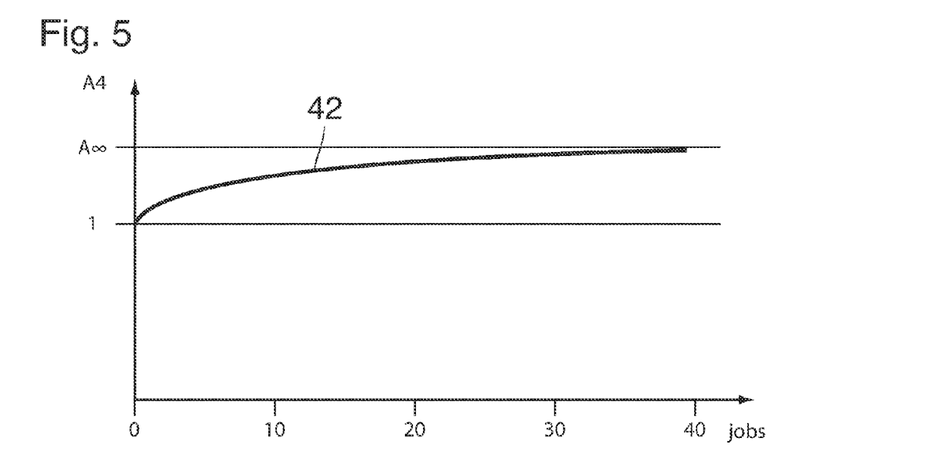
FIG. 5 is a diagram illustrating a change of a correction factor as a function of the number of jobs that have been processed.

In the three job types and sub-types that have been illustrated in FIG. 4, the correction factors A1-A4 have a tendency to rise asymptotically to a certain limit which reflects the optimum correction factor under the given conditions. This asymptotic behavior has been shown graphically in FIG. 5, where a curve 42 shows the updated correction factor A4 as a function of the number of jobs that have been processed. It can be seen that the curve starts at the initial value 1 for the correction factor and then asymptotically approaches a limit A∞.

For other job types, the correction factors may have a tendency to go down asymptotically to a certain limit, which reflects the optimum correction factor or the correction factors may have the tendency to oscillate asymptotically to the certain limit.

Figure 6:
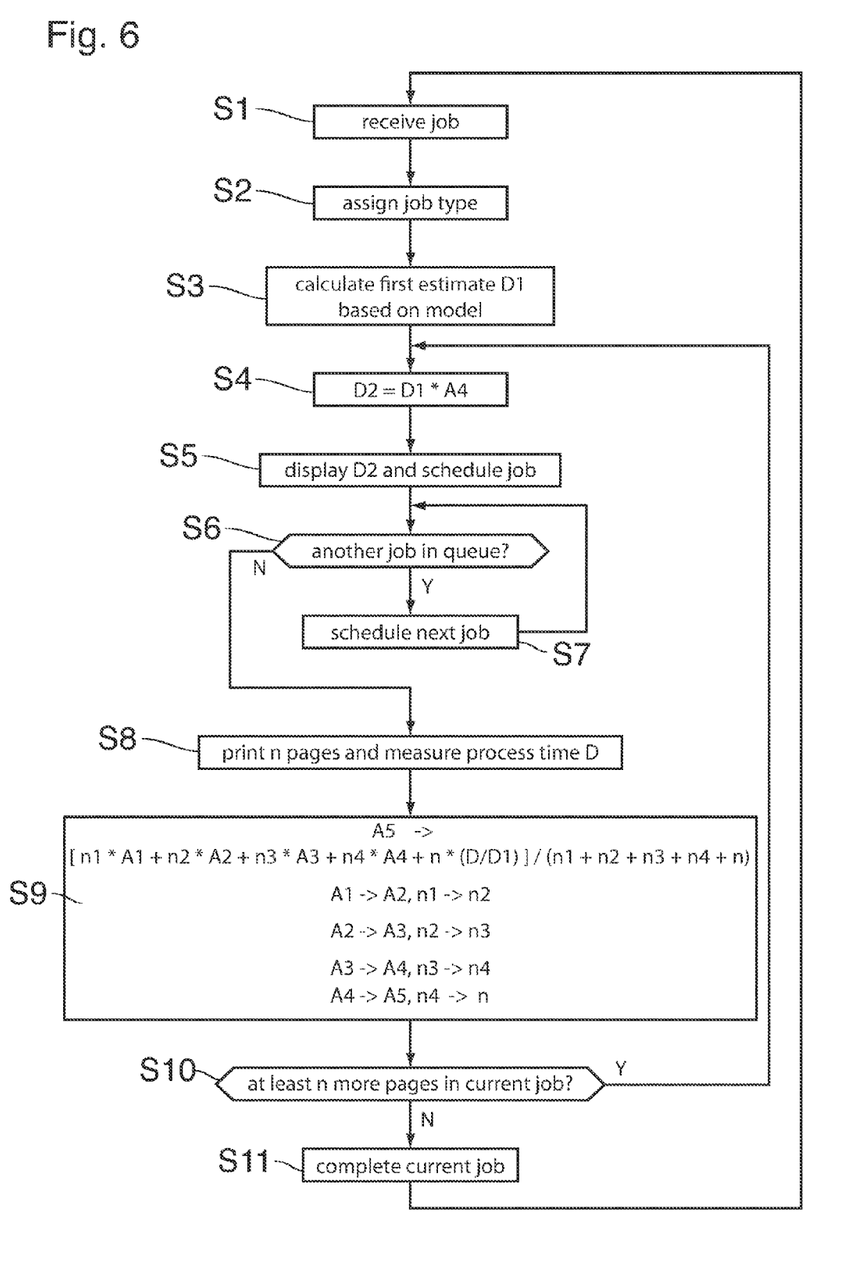
FIG. 6 is a flow diagram illustrating the method according to the invention.

The essential steps of a representative example of the method according to the invention have been shown in a flow diagram in FIG. 6.

A new job is received and added to the print queue in step S1. The job specifications of this job, i.e. the values of all attributes, are read in step S2, and the table 40' is searched for a job type that matches with all attributes, and this job type is assigned to the received job.

Then, in step S3, a model-based first estimate D1 for a processing time for a specified collection of pages is calculated. The specified collection of pages may comprise, for example, a fixed number of pages, one or more complete sets or even the total number of pages of the job.

In step S4, the correction factor A4 is read from the table 40' and multiplied with the first estimate D1 so as to obtain the second estimate D2 for the processing duration. This second estimate D2 is then displayed in the schedule 30 (FIG. 2) and is used for scheduling the job in step S5.

In step S6, it is checked whether another print job has meanwhile been received and added to the print queue. If this is the case (Y), the new job is scheduled in Step S7, and the process loops back to step S6, and steps S6 and S7 are repeated until all jobs in the queue have been scheduled.

When the result in step S6 is "no" (N), and when it is the turn for the job that has been received in step S1 to be processed, a number of n of pages of this job is processed in step S8, and the time D that has actually been needed for finishing these n pages is measured.

Then, in step S9, a new updated correction factor A5 is calculated as a weighted sum of the old correction factors A1-A4 and the inaccuracy factor D/D1, and the sliding window is shifted-through.

When, in Step S8, n had been selected to be smaller than the total number of pages of the job, it is checked in step S10 whether the job still contains at least n more pages that have not yet been processed, and if this is the case (Y), the process loops back to step S4.

Since the correction factor A4 has been updated in step S9, it will be observed that the value D2 changes in step S4, and the subsequent execution of steps S5 and S7 will involve a re-scheduling of the rest of the current job and of all the jobs of the same type that are waiting in the print queue, based on the updated value of the correction factor A4.

Then, the process continues with step S8 for processing the next batch of n pages.

When the answer in step S8 is "no" (N), the job is completed in step S9 (if there are any pages left), and the process loops back to step S1 to start a new cycle for the next print job.

In the example shown in FIG. 6, it has been assumed that the job for which the update of the correction factor is made in step S7 is a job with only a unique finishing attribute for all pages. In case of a mixed job with different finishing attributes for different pages, an update procedure analogous to step S7 would have to take the relative numbers of pages ($n_{1.1}$, $n_{1.2}$) into account. It is straightforward to derive a suitable formula for the update, but the calculation may become relatively complicated in case of a very complex print job. It is possible, however, to exclude such complicated print jobs from the update procedure. In that case, the steps S8 to S11 would be replaced simply by a step of printing all pages of the job. However, steps S2-S5 can still be used for scheduling this job, with step S4 being modified by replacing the correction factor A4 with the averaged correction factor $A_{ave}$, as has been explained in conjunction with FIG. 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling an image reproduction system, the image reproduction system including a print engine and an electronic controller, wherein a process duration for processing a reproduction job is estimated on the basis of a measured time (D) for the processing of a number (n) of pages that have been processed already, said method comprising the steps of:

storing a digital table by the electronic controller in the image reproduction system, said digital table containing a number of pre-defined job types and a respective correction factor (A; A4) for each job type in the image reproduction system, each job type being at least determined by a media attribute;

receiving a print job by the electronic controller of the image reproduction system;

assigning, by the electronic controller, a job type from the digital table to the received job;

calculating, by the electronic controller, a first estimate (D1) for a time needed for processing at least a specified collection of pages from the job, said first estimate being calculated on the basis of a model that reflects at least the dependency of the processing time on the number of pages to be processed;

calculating, by the electronic controller, a second estimate (D2) by multiplying the first estimate (D1) with the correction factor (A; A4) that is related to the assigned job type;

scheduling, by the electronic controller, the job using the second estimate (D2);

processing, by the print engine, the print job by printing said specified collection of pages by the image reproduction system;

measuring, by the electronic controller, a processing time (D) needed for printing said specified collection of pages;

calculating, by the electronic controller, a deviation of the first estimate (D1) from the processing time (D) that has actually been needed for processing said specified collection of pages, and updating the correction factor (A; A4) on the basis of the deviation; and updating, by the electronic controller, the image reproduction system by storing the updated correction factor in the digital table in the image reproduction system.

2. The method according to claim 1, wherein the digital table stores, for each correction factor (A; A4), a number (n; n4) of pages, the processing durations of the number of pages having been involved in calculating the correction factor, and the update of the correction factor includes calculating a weighted sum of the correction factor (A; A4) from the table and an inaccuracy factor (D/D1) that indicates said deviation, with the respective numbers of pages involved as weight factors.

3. The method according to claim 2, wherein the digital table includes a series of pairs of correction factors (A1-A4) and numbers (n1-n4) of pages involved, each correction factor being an update of a predecessor in the series, respectively, and wherein said weighted sum includes a sum of all the correction factors (A1-A4) in the series, with respective numbers (n1-n4) of pages as weight factors, and the update includes discarding the oldest correction factor (A1) from the table, shifting the other correction factors (A2-A4) by one position in the series, and entering the latest update of the correction factor as a last correction factor (A4) in the series.

4. The method according to claim 1, wherein said collection of pages includes less than the total number of pages of the job, and the second estimate (D2) is used for calculating an expected process duration for the entire job.

5. The method according to claim 4, wherein the steps of calculating the second estimate and updating the correction factor and storing the same are repeated for further collections of pages in the job.

6. The method according to claim 1, wherein the second estimate (D2) is used for calculating an expected process duration for at least one job of the same type that is to be processed later.

7. The method according to claim 6, wherein the second estimate (D2) is used for scheduling said at least one job of the same type.

8. The method according to claim 1, wherein the digital table includes at least one job type with multiple finishing options, said job type being divided into sub-types, each of the sub-types having a unique finishing attribute, the table further including independent correction factors (A1.1, A1.2) for each sub-type, and wherein, when a received job is a mixed job, specifying at least two of said multiple finishing options among which each finishing option applies only a fraction (n1.1, n1.2) of the total number of pages of the job, and wherein the correction factor used for calculating the second estimate (D2) is obtained by forming a weighted sum of the correction factors (A1.1, A1.2) assigned to the respective finishing attributes, with the respective fractions (n1.1, n1.2) of the numbers of pages as weight factors.

9. An image reproduction system for processing a number of image reproduction jobs, comprising:

a print engine; and an electronic controller adapted to control the image reproduction system, where a process duration for processing a reproduction job is estimated on the basis of a measured time (D) for the processing of a number (n) of pages that have been processed already, wherein the electronic controller is configured to:

receiving a print job;

assigning a job type from the digital table to the received job;

calculating a first estimate (D1) for a time needed for processing at least a specified collection of pages from the job, said first estimate being calculated on the basis of a model that reflects at least the dependency of the processing time on the number of pages to be processed;

calculating a second estimate (D2) by multiplying the first estimate (D1) with the correction factor (A; A4) that is related to the assigned job type; and scheduling the job using the second estimate (D2), the print engine is configured to process the print job by printing said specified collection of pages by the image reproduction system, and the electronic controller is further configured to:

measuring a processing time (D) needed for printing said specified collection of pages;

calculating a deviation of the first estimate (D1) from the processing time (D) that has actually been needed for processing said specified collection of pages, and updating the correction factor (A; A4) on the basis of the deviation; and updating the image reproduction system by storing the updated correction factor in the digital table in the image reproduction system.

10. The image reproduction system according to claim 9, further comprising at least one finisher.

11. A non-transitory recording medium comprising computer-executable program code configured to instruct a computer to perform the method according to claim 1.

* * * * *